Figure 3:
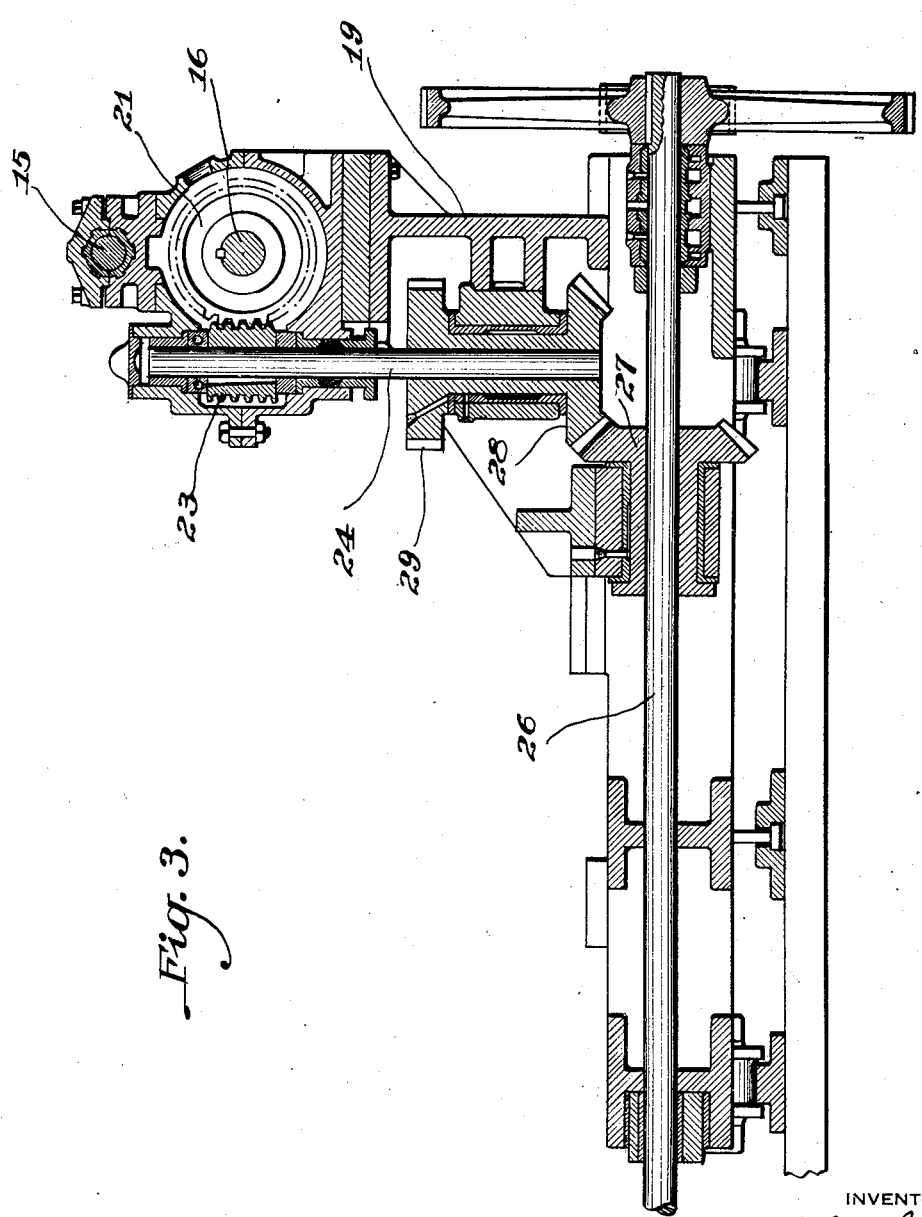

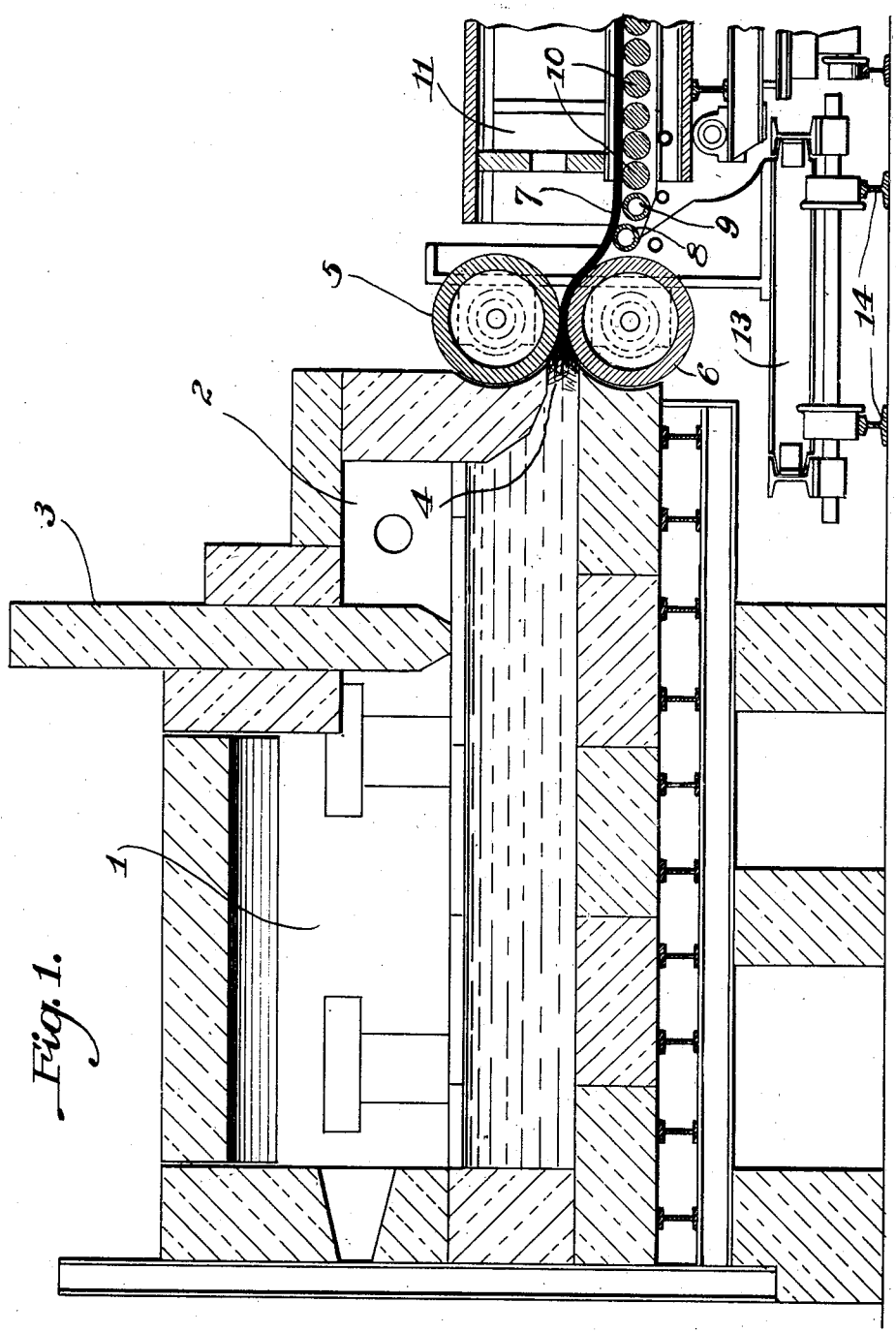

May 11, 1926.
K. L. W. CORE
1,583,779
PROCESS AND APPARATUS FOR MAKING SHEET GLASS
Filed July 9, 1925  3 Sheets-Sheet 2
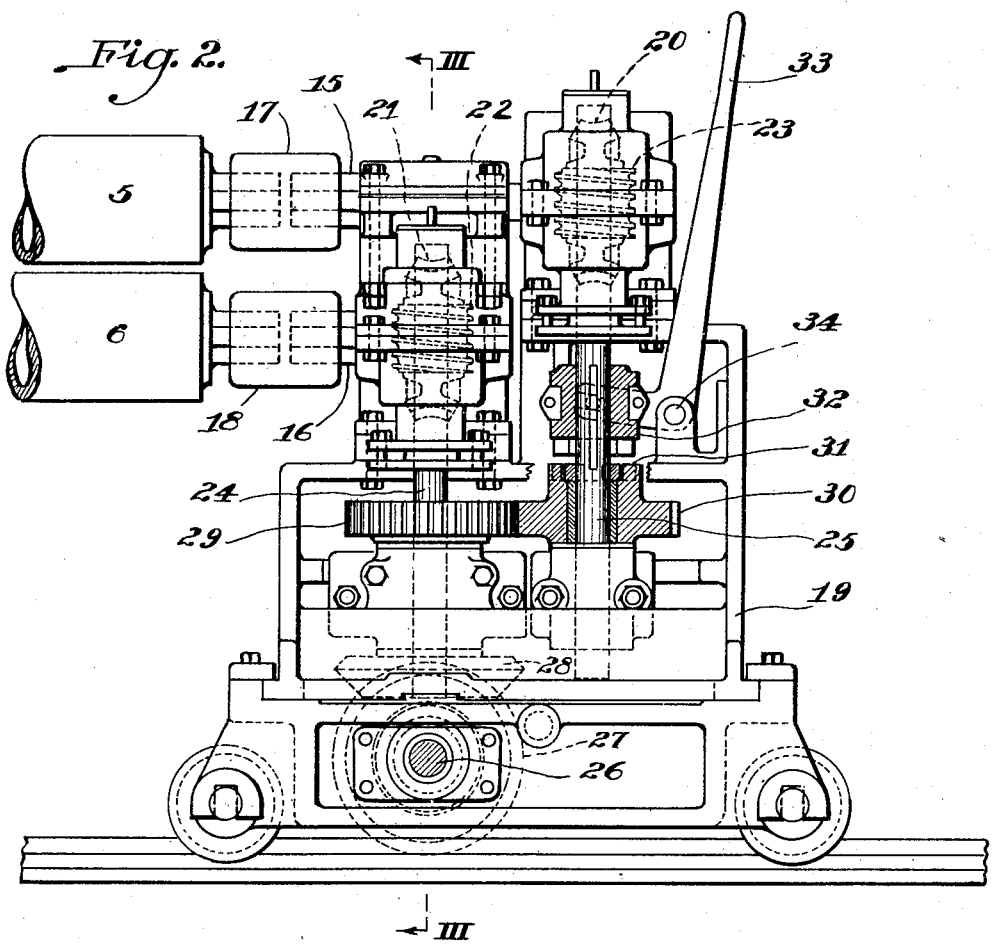
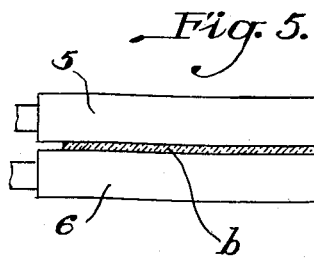
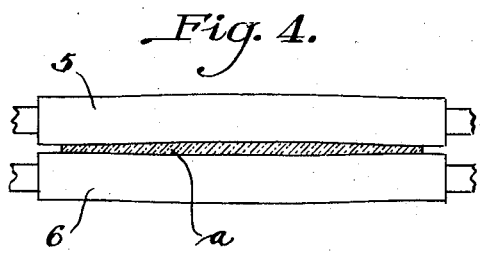
INVENTOR May 11, 1926.

K. L. W. CORE 1,583,779

PROCESS AND APPARATUS FOR MAKING SHEET GLASS

Filed July 9, 1925   3 Sheets-Sheet 3

INVENTOR
K. L. W. Core
by
James C. Bradley
atty

Patented May 11, 1926.

1,583,779

UNITED STATES PATENT OFFICE.

KARL L. W. CORE, OF FORD CITY, PENNSYLVANIA, ASSIGNOR TO PITTSBURGH PLATE GLASS COMPANY, A CORPORATION OF PENNSYLVANIA.

PROCESS AND APPARATUS FOR MAKING SHEET GLASS.

Application filed July 9, 1925. Serial No. 42,519.

The invention relates to a process and apparatus for making glass continuously in the form of a sheet or ribbon by withdrawing the glass between a pair of sizing rolls. In the course of time, it often happens that the rolls become slightly warped. In many cases, the rolls are bowed away from each other at the center, so that the sheet or ribbon produced is substantially thicker at the center than at the edges. This variation in thickness from the center to the edge of the sheet may amount to one-sixteenth of an inch or more, and it is the purpose of the present invention to provide a means and a procedure whereby the variation in the thickness of the sheet is reduced to a minimum. Briefly stated, this result is accomplished by providing for the adjustment (circumferentially) of one of the rolls with respect to its driving roll and with respect to the other roll so that the bowed surfaces of the rolls on opposite sides of the pass are brought into substantial parallelism. The sheet produced in the pass as thus provided is bowed, but is of substantially uniform thickness from edge to edge, and the bow produced is practically negligible and is readily eliminated as the sheet passes through the leer. One form of apparatus is illustrated in the accompanying drawings, wherein:

Figure 1 is a vertical section showing in a diagrammatic way the general arrangement of the apparatus. Fig. 2 is a front elevation, partially in section showing the driving mechanism for the rolls. Fig. 3 is a section on the line III—III of Fig. 2. And Figs. 4 and 5 are diagrammatic views illustrating the purpose to which the invention is directed, the proportions of the parts in these views being somewhat exaggerated in order to better illustrate the point under consideration.

Referring first to the general arrangement, 1 is the end of a melting tank, preferably of the regenerator type wherein glass is continuously melted and supplied to the extension 2. 3 is a gate or cut-off, suitably operated from above by means, not shown, and 4 is an outlet slot by means of which glass is supplied between the sizing rolls 5 and 6, such rolls being suitably fluid cooled and driven as later described. The glass sheet or ribbon 7 which is formed passes over the rollers 8, 9, 10, etc. and into the roller leer 11, the sheet being flattened and annealed as it passes through the leer and being cut up into sections of suitable length at the outlet end thereof. The rolls 5 and 6 and the driving mechanism are preferably mounted upon a truck 13 carried by the rails 14, so that the apparatus may be removed from position in front of the tank when desired.

The method of driving the rolls 5 and 6 is illustrated in Figs. 2 and 3, such rolls being connected to the shafts 15 and 16 by means of the coupling sleeves 17 and 18. The shafts 15 and 16 are journaled in the standard or framework 19 and are provided with the worm wheels 20 and 21 by means of which the shafts are driven from the worms 22 and 23, carried by the vertical shafts 24 and 25. The shaft 24 is driven from a horizontal shaft 26 through the intermediary of the bevel gears 27 and 28, the shaft 26 being itself driven by means of a motor carried upon the truck 13, but not shown. The shaft 25 is driven from the shaft 24 by means of the spur gears 29 and 30, the latter being free to rotate on the shaft 25, but being provided with a clutch face 31. The clutch face 31 is adapted to be engaged by a corresponding face on the clutch 32, which clutch is splined to the shaft 25, so that when it is in its lower position, the shaft 25 is positively driven. The clutch is operated by means of the hand lever 33 pivoted at 34. Ordinarily the clutch is in this lower position, and the rolls 5 and 6 are driven at the same peripheral speed.

If, however, the rolls 5 and 6 should become slightly bowed away from each other in service, as indicated in Fig. 4, the clutch 32 is brought into play. At this time, it will be seen that the ribbon of glass passing between the rolls 5 and 6 will have the configuration indicated at a, being thickest at the center of the rolls and decreasing in thickness from this point to the edges of the sheet. This condition does not render the glass unfit for use, but it does increase the cost involved in grinding which calls for the reduction of the surfaces of the sheet to parallel planes. An adjustment is made to take care of this condition by moving the clutch 32 up so that as the rolling progresses, there is a relative peripheral rotation between the two rolls, the roll 6 being driven at this time, and the roll 5 being merely an idler. The tendency of the roll 5 is to rotate at the same peripheral speed as the roll 6, due to the turning contact upon the roll of the glass sheet, but there will be some slippage, so that the roll 5 will finally arrive at a position so that its bow is in substantial parallelism with the bow of the roll 6, as indicated in Fig. 5. The sheet which is being produced will, therefore, have the cross section, as indicated at *b* in Fig. 5, the sheet being slightly bowed, the opposing surfaces thereof being in substanial parallelism. The bow produced is relatively slight and is readily eliminated, as the sheet passes through the leer 11. It will be understood that the bow of the rolls, as indicated in Figs. 4 and 5 is much exaggerated and also that the proportions of the rolls and the thickness of the sections *a* and *b* are shown without any attempt at accuracy. The same adjustment might be made without using the clutch 32 in a construction which does not employ such clutch by disengaging one of the couplings 17 or 18 from the roll shafts or from the shafts 15 and 16. This is easily done by slipping them endwise, but the clutch forms a much more convenient means for accomplishing this result and gives a much finer adjustment. The expedient permits the use of rolls which would otherwise have to be removed from the machine and resurfaced, or replaced by other rolls, thus involving a shut down of the apparatus and a large expense.

What I claim is:

1. A process for making sheet glass which consists in flowing the glass from a molten bath to the pass between a pair of forming rolls, driving the rolls at the same peripheral speed, and shifting the relation of one of the rolls to its driving means to bring the rolls into parallelism in case they become bowed away from each other in service.

2. A process for making sheet glass which consists in flowing the glass from a molten bath to the pass between a pair of forming rolls, driving the rolls at the same peripheral speed, and shifting the rotary position of one of the rolls with respect to that of the other to bring the rolls into parallelism in case they become bowed away from each other in service.

3. In combination in apparatus for forming a glass sheet or ribbon from a molten bath of glass, a pair of rolls for receiving the molten glass from the bath and forming it into a sheet, and mechanism for driving the rolls at the same peripheral speed, such mechanism including a releasable driving connection for one of the rolls permitting of a relative rotary adjustment of one roll with respect to the other.

4. In combination in apparatus for forming a glass sheet or ribbon from a molten bath of glass, a pair of rolls for receiving the molten glass from the bath and forming it into a sheet and mechanism for driving the rolls at the same peripheral speed, such mechanism including a clutch driving connection for one of the rolls permitting of a relative rotary adjustment of one roll with respect to the other.

In testimony whereof, I have hereunto subscribed my name this 9th day of June, 1925.

KARL L. W. CORE.